United States Patent
Lee et al.

(10) Patent No.: US 8,971,197 B2
(45) Date of Patent: Mar. 3, 2015

(54) METHOD FOR REPORTING UPLINK CONTROL INFORMATION AND WIRELESS COMMUNICATION DEVICE USING THE SAME

(75) Inventors: Chien-Min Lee, New Taipei (TW); Chia-Pang Yen, Taipei (TW)

(73) Assignee: Industrial Technology Research Institute, Hsinchu (TW)

( * ) Notice: Subject to any disclaimer, the term of this patent is extended or adjusted under 35 U.S.C. 154(b) by 269 days.

(21) Appl. No.: 13/431,984

(22) Filed: Mar. 28, 2012

(65) Prior Publication Data

US 2012/0250549 A1 Oct. 4, 2012

Related U.S. Application Data

(60) Provisional application No. 61/470,719, filed on Apr. 1, 2011, provisional application No. 61/549,755, filed on Oct. 21, 2011.

(30) Foreign Application Priority Data

Jan. 19, 2012 (TW) .............................. 101102216 A

(51) Int. Cl.
*H04W 24/10* (2009.01)
*H04L 5/00* (2006.01)

(52) U.S. Cl.
CPC ............. *H04W 24/10* (2013.01); *H04L 5/0007* (2013.01); *H04L 5/0048* (2013.01); *H04L 5/0053* (2013.01)
USPC ............................ 370/252; 370/253; 370/343

(58) Field of Classification Search
None
See application file for complete search history.

(56) References Cited

U.S. PATENT DOCUMENTS

| 8,626,222 B2* | 1/2014 | Kotecha ........................ 455/513 |
| 2009/0059844 A1* | 3/2009 | Ko et al. ........................ 370/328 |
| 2010/0315969 A1* | 12/2010 | Jongren et al. ................ 370/252 |
| 2011/0009148 A1* | 1/2011 | Kotecha ........................ 455/513 |

(Continued)

FOREIGN PATENT DOCUMENTS

| TW | 200832959 | 8/2008 |
| TW | 201004175 | 1/2010 |
| TW | 201126955 | 8/2011 |

OTHER PUBLICATIONS

Juho Lee, Mimo Technologies in 3GPP LTE and LTE-Advanced, Hindawi Publushing Corporation, vol. 2009, Artical ID 302092, 10 pages.*

(Continued)

*Primary Examiner* — Ian N Moore
*Assistant Examiner* — Phong La
(74) *Attorney, Agent, or Firm* — Jianq Chyun IP Office

(57) ABSTRACT

A method for reporting uplink control information and a wireless communication device using the same are disclosed. The wireless communication device supports multiple component carriers (CC), and the proposed method includes following steps. When a base station requests the wireless communication device to transmit aperiodic channel state information (CSI) report of one or more downlink CC to the base station, but the CSI of the downlink CCs may be invalid, following steps are executed on the downlink CC. Full payloads of channel quality indicator (CQI)/precoding matrix indicator (PMI) corresponding to a plurality of selectable RI values of the downlink CC are respectively calculated. Additionally, an RI value of the downlink CC is selected according to the full payloads of the CQI/PMI corresponding to the selectable RI values.

14 Claims, 8 Drawing Sheets

(56) References Cited

U.S. PATENT DOCUMENTS

| | | | |
|---|---|---|---|
| 2011/0032839 A1* | 2/2011 | Chen et al. | 370/252 |
| 2011/0134774 A1* | 6/2011 | Pelletier et al. | 370/252 |
| 2011/0142144 A1 | 6/2011 | Allpress et al. | |
| 2011/0249578 A1* | 10/2011 | Nayeb Nazar et al. | 370/252 |
| 2011/0305161 A1* | 12/2011 | Ekpenyong et al. | 370/252 |
| 2012/0039279 A1* | 2/2012 | Chen et al. | 370/329 |
| 2012/0082049 A1* | 4/2012 | Chen et al. | 370/252 |
| 2012/0082157 A1* | 4/2012 | Yamada et al. | 370/389 |
| 2012/0087254 A1* | 4/2012 | Yin et al. | 370/252 |
| 2012/0127869 A1* | 5/2012 | Yin et al. | 370/252 |
| 2012/0140708 A1* | 6/2012 | Choudhury et al. | 370/328 |
| 2012/0250558 A1* | 10/2012 | Chung et al. | 370/252 |
| 2013/0088980 A1* | 4/2013 | Kim et al. | 370/252 |
| 2013/0148613 A1* | 6/2013 | Han et al. | 370/329 |
| 2013/0286933 A1* | 10/2013 | Lee et al. | 370/315 |

OTHER PUBLICATIONS

"3GPP TS 36.212: 3rd Generation Partnership Project; Technical Specification Group Radio Access Network; Evolved Universal Terrestrial Radio Access (E-UTRA); Multiplexing and channel coding", 3GPP, 2011, p. 1-78.

"3GPP TS 36.213: 3rd Generation Partnership Project; Technical Specification Group Radio Access Network; Evolved Universal Terrestrial Radio Access (E-UTRA); Physical layer procedures", 3GPP, 2011, p. 1-125.

"3GPP TS 36.300: 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2", 3GPP, 2011, p. 1-200.

"3GPP TS 36.321: 3rd Generation Partnership Project; Technical Specification Group Radio Access Network; Evolved Universal Terrestrial Radio Access (E-UTRA); Medium Access Control (MAC) protocol specification", 3GPP, 2011, p. 1-54.

"3GPP TS 36.331: 3rd Generation Partnership Project; Technical Specification Group Radio Access Network; Evolved Universal Terrestrial Radio Access (E-UTRA); Radio Resource Control (RRC); Protocol specification", 3GPP, 2011, p. 1-296.

"LS on CQI reporting at SCell activation", RAN2, Feb. 2011, p. 1-1.

"Reply LS on CQI reporting at SCell activation", RAN1, Feb. 2011, p. 1-1.

"CQI reporting at SCell activation", Samsung, Feb. 2011, p. 1-3.

"CSI Reporting at SCell activation/deactivation", Texas Instruments, Feb. 2011, p. 1-2.

"CQI reporting with SCell Activation", Research In Motion, UK Limited, Feb. 2011, p. 1-3.

* cited by examiner

METHOD FOR REPORTING UPLINK CONTROL INFORMATION AND WIRELESS COMMUNICATION DEVICE USING THE SAME

CROSS-REFERENCE TO RELATED APPLICATION

This application claims the priority benefit of U.S. provisional application Ser. No. 61/470,719, filed on Apr. 1, 2011 and no. 61/549,755, filed on Oct. 21, 2011. This application also claims the priority benefit of Taiwan application serial no. 101102216, filed on Jan. 19, 2012. The entirety of each of the above-mentioned patent applications is hereby incorporated by reference herein and made a part of this specification.

BACKGROUND

1. Technical Field

The disclosure relates to a method for reporting uplink control information in a wireless communication system and a wireless communication device using the same.

2. Related Art

With continual development of wireless wideband communication network standards nowadays, a single base station may be configured to support multiple component carriers (CC) so that the overall throughput is increased. In a wireless communication system, a base station may activate a CC (for example, as a primary CC) and keep the other operational CCs deactivated. For example, for two configured CC #0 and CC #1, a base station can activate the CC #0 and keep the CC #1 deactivated.

Assuming that at a time point $t_1$, a base station has activated a CC #0 for a user equipment (UE), then the UE needs to execute at least 3 tasks on the CC #0, such as receiving data in a downlink channel (for example, a physical downlink control channel (PDCCH) and a physical downlink shared channel (PDSCH) specified in the Third Generation Project Partnership (3GPP) standard), transmitting uplink data in an uplink channel corresponding to the downlink control information, and measuring quality (also referred to as channel state information (CSI)) of a downlink channel between the base station and the UE and reporting the CSI to the base station by using suitable resources and at a proper time. Since the CC #1 is deactivated at the time point $t_1$, the UE does not need to execute aforementioned 3 tasks on the CC #1.

Except for the primary cell, the base station can activate or deactivate the configured secondary CCs by transmitting command messages to each UE. At a time point $t_2$ after the time point $t_1$, the UE receives an activation command for activating the CC #1 from the base station. The activation command may be a command message on the media access control (MAC) layer.

At the time point $t_2$, the UE needs to execute related tasks on the CC #1, such as making a radio frequency (RF) circuit perform re-adjustment procedures corresponding to the CC #1 and making related communication protocol software to be in a ready state, so as to measure the CSI of the CC #1 after the time point $t_2$ (step S13). At a time point $t_2+8$ after the time point $t_2$ (herein "8" refers to 8 unit time), the UE starts to execute aforementioned 3 tasks on the CC #1. After the time point $t_2+8$, the base station may issue a request message to the UE to request the UE to report the CSI of the downlink channel corresponding to the CC #1. The base station can schedule downlink transmission by using the reported CSI.

In a practical implementation (for example, a 3GPP LTE system), the UE obtains the CSI of the CC #1 by measuring a channel state information-reference signal (CSI-RS) of the CC #1 and generates a corresponding CSI report according to the CSI. However, since no predetermined periodic CSI-RS is received or an RF circuit is not ready from the time point $t_2$ to the time point $t_2+8$, the UE cannot measure the CSI of the CC #1 or generate the corresponding CSI report. According to an existing 3GPP wireless communication standard, from the time point $t_2+8$ to the time point $t_2+8+n$ (herein "n" units of time is the time specified by the base station for the UE to provide the CSI report), because the UE cannot successfully measure the CSI of the CC #1, it is allowed to provide an invalid CSI report to the base station.

A CSI report usually includes three main parameters: a channel quality indicator (CQI), a precoding matrix indicator (PMI), and a rank indicator (RI). The UE can set the CQI parameter to "0" in the CSI report to indicate that the CSI report is an invalid CSI report. The PMI and RI parameters are configured by a communication system with multi-input multi-output (MIMO) antenna configuration.

The CSI report can be submitted in a periodic manner or an aperiodic manner. To submit the CSI report in the periodic manner, the entire CSI report is divided into several parts and transmitted via an uplink control channel (for example, a PUCCH), and all these reported parts are integrated into the original CSI report by the base station. To submit the CSI report in the aperiodic manner, a dynamic request is issued by the base station, and the entire CSI report is transmitted to the base station all at once via an uplink shared channel (for example, a PUSCH).

During an aperiodic CSI reporting procedure, the base station requires the UE to provide a CSI report by using downlink control information. To be illustrated more clearly, the base station issues an uplink grant to the UE via a downlink control channel and requires the UE to provide a CSI report regarding a specific CC through the uplink grant, where the uplink grant indicates the physical resources in an uplink shared channel (for example, a PUSCH) to be used by the UE. Thereafter, the UE transmits uplink data via the granted uplink shared channel and provides the CSI report of the specific CC to the base station all at once via the uplink shared channel.

If the UE cannot successfully measure the CSI of the specific CC, it provides an invalid CSI report for this CC. The invalid CSI report usually occupies a lot of physical resources in the uplink shared channel. For example, in addition to uplink data, a CSI report may further include a wideband CQI of a specific CC, subband CQIs of all sub-carriers of the specific CC, a wideband PMI of the specific CC, subband PMIs of all subbands of the specific CC, and a RI value of the specific CC.

SUMMARY

The disclosure provides a method for reporting uplink control information. According to an exemplary embodiment of the disclosure, the method for reproting uplink control information is adapted to a wireless communication device supporting multiple component carriers (CC) and includes following steps. When the wireless communication device is scheduled to transmit an aperiodic channel state information (CSI) report of an activated downlink CC to a base station via an uplink shared channel but the wireless communication device has not successfully measured CSI of the activated downlink CC, the wireless communication device executes following steps on the activated downlink CC. The wireless communication device respectively calculates full payloads of channel quality indicator (CQI)/precoding matrix indicator (PMI) corresponding to a plurality of selectable rank indicator (RI) values and selects a RI value of the activated downlink CC according to the full payloads of the CQI/PMI corresponding to the selectable RI values.

The disclosure provides a wireless communication device. According to an exemplary embodiment of the disclosure, the wireless communication device includes a transceiver and a communication protocol module. The transceiver is configured to receive wireless signals from a base station and transmits wireless signals to the base station. The communication protocol module is connected to the transceiver. The communication protocol module is configured to receive at least one downlink CC from the base station through the transceiver, measures CSI of the downlink CC through the transceiver, and receive a request message which requires an aperiodic CSI report of an activated downlink CC to be transmitted via an uplink shared channel to the base station. To be illustrated more clearly, when the communication protocol module is scheduled to transmit the aperiodic CSI report but has not successfully measured the CSI of the activated downlink CC, the communication protocol module respectively calculates full payloads of CQI/PMI corresponding to a plurality of selectable RI values of the activated downlink CC. In addition, the communication protocol module selects a RI value of the activated downlink CC according to the full payloads of the CQI/PMI corresponding to the selectable RI values.

Several exemplary embodiments accompanied with figures are described in detail below to further describe the disclosure in details.

BRIEF DESCRIPTION OF THE DRAWINGS

The accompanying drawings are included to provide further understanding, and are incorporated in and constitute a part of this specification. The drawings illustrate exemplary embodiments and, together with the description, serve to explain the principles of the disclosure.

DETAILED DESCRIPTION OF DISCLOSED EMBODIMENTS

As described previously, when a user equipment (UE) transmits an invalid channel state information (CSI) report, most system resource in an uplink shared channel are occupied, and thus the throughput of uplink data is reduced accordingly. As a result, the overall throughput is reduced. Since the UE submits the invalid CSI report simply as an indicative symbol for notifying the base station that presently a channel state information-reference signal (CSI-RS) (for example, a rank indicator (RI) value) cannot be successfully measured, the physical resource in the uplink shared channel taken up by the CSI report should be reduced as much as possible.

In the present disclosure, a wireless communication device may be a user equipment (UE), a mobile station (MS), an advanced mobile station (AMS), a wireless terminal communication device, a M2M device, or a MTC device. The wireless communication device may be a digital television (TV), a digital set-top box, a personal computer (PC), a notebook computer, a tablet computer, a netbook, a mobile phone, a smart mobile phone, a water meter, a gas meter, a watt-hour meter, an alarm, a sensor, or a monitor. In the present disclosure, a base station (BS) may be an advanced base station, a node B system, or an evolved node B (eNB).

In the present disclosure, the term "downlink (DL)" refers to radio frequency (RF) signal transmission from a base station to a wireless communication device within the radio range of the base station. The term "uplink (UL)" refers to RF signal transmission from a wireless communication device to a base station accessed by the wireless communication device.

Figure 1:
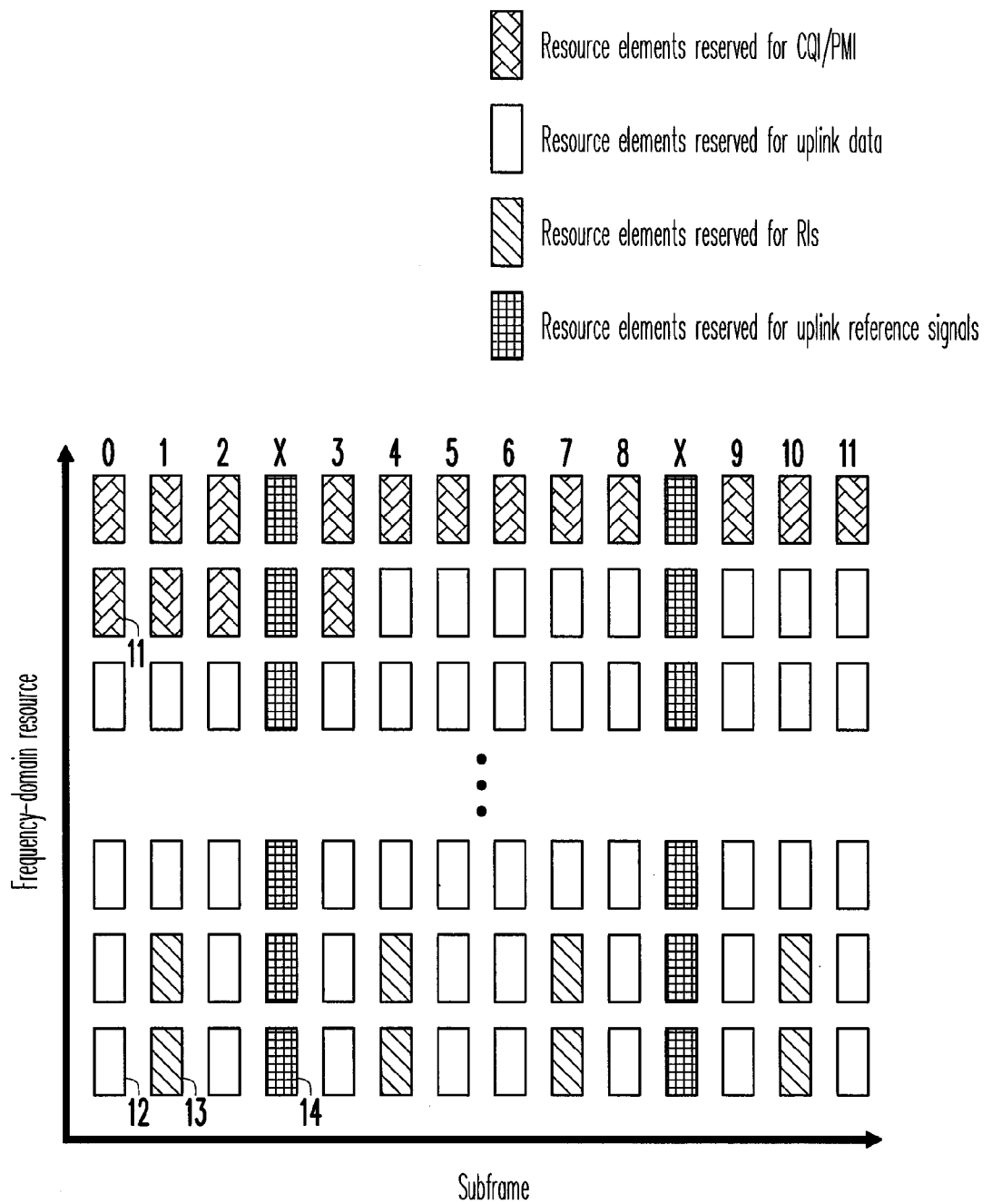
FIG. 1 is a schematic diagram of an orthogonal frequency-division multiplexing (OFDM) subframe.

FIG. 1 is a schematic diagram of an orthogonal frequency-division multiplexing (OFDM) subframes. FIG. 1 illustrates the relationship between uplink data and CSI. Referring to FIG. 1, the horizontal axis represents time (corresponding to subframe), the vertical axis represents the frequency domain (corresponding to frequency-domain resource), and an OFDM subframe has 14 OFDM symbols, wherein the top two columns of OFDM symbols (for example, the resource elements 14) marked with "X" are merely configured for allocating demodulation reference signals (i.e., not for allocating uplink data or CQI/PMI/RI value in a CSI report).

RI values may be allocated at the resource elements denoted with diagonal lines (as shown in FIG. 1, the resource elements at the bottom of the $1^{st}$, $4^{th}$, $7^{th}$, and $10^{th}$ columns). In some embodiments, there may be 2 resource elements (for example, the resource elements 13) in each column for allocating RI values. The RI values may be allocated from bottom to top in an order of "1=>10=>7=>4", where the figures in "1=>10=>7=>4" refer to an order of OFDM symbols. The CQI/PMI may be allocated at the resource elements denoted with perpendicular diagonal lines (for example, the resource elements 11). The CQI/PMI may be allocated from left to right and from top to bottom. The remaining resource elements with the blank background (for example, the resource elements 12) may be configured for allocating uplink data. It is noted that after a RI value is selected, those resource elements marked with diagonal lines on background representing being reserved for RI value but not actually allocating any RI value may be configured for transmitting uplink data, such that the overall uplink throughput may be increased. Similarly, after a RI value is selected, those resource elements which are denoted with perpendicular diagonal lines and not configured for allocating CQI/PMI may be configured for transmitting uplink data.

Referring to FIG. 1, the number $Q'_{RI}$ of the resource elements configured for allocating RI values may be obtained through following equation:

$$Q'_{RI} = \min\left(\left\lceil \frac{O_{RI} \times M_{SC}^{PUSCH} \times N_{symbol}^{PUSCH} \times \beta_{offset}^{CQI}}{K} \right\rceil, 4 \times M_{SC}^{PUSCH}\right) \quad \text{Equation (1)}$$

In the equation (1), $Q'_{RI}$ is the number of resource elements which are configured for allocating the presently selected or measured RI value, $O_{RI}$ is the bit number of the presently selected or measured RI value (the number of bits of the RI cannot be changed, while the RI value is a variable), $M_{SC}^{PUSCH}$ is the number of sub-carriers which are allowed to be transmitted, and $N_{Symbol}^{PUSCH}$ is the number of OFDM symbols (for example, 12). To be illustrated more clearly, $N_{Symbol}^{PUSCH}$ is the number of OFDM symbols which are allowed to be transmitted in a subframe after a reference signal RS is deducted, where a subframe has 14 OFDM symbols. For an base station (or an eNB), when a subframe is configured for transmitting sounding reference signal (SRS), the last OFDM symbol in such subframe cannot be used to transmit PUSCH; and in such circumstance, the $N_{Symbol}^{PUSCH}$ may equal to 11. Also, in the equation (1), K is the total quantity of uplink data that is segmented and protected with a cyclic redundancy check (CRC) code (i.e., the total number of resource elements of a OFDM subframe), $\beta_{Offset}^{RI}$ is an offset configured in an upper layer of the communication protocol stack, $\lceil X \rceil$ is a ceiling function (configured for obtaining a minimum integer value of the distance parameter X), and min(A, B) is to select a minimum value between values A and B. Further, the value $4 \times M_{SC}^{PUSCH}$ is the maximum number of resource elements reserved for RI values. Additionally, in the present disclosure, the resource specified in an uplink grant issued by a base station is in unit of a resource block.

In the equation (1), the number of bits cannot be changed while the RI value is a variable. For example, when $O_{RI}$ is 2, the RI value may be 1, 2, 3, or 4, when $O_{RI}$ is 3, the RI value may be 1-8, and when $O_{RI}$ is 4, the RI value may be 1-16. According to the equation (1), $$\frac{O_{RI} \times M_{SC}^{PUSCH} \times N_{symbol}^{PUSCH}}{K}$$

is a proportion of the number of resource elements reserved for RI values to the maximum number of resource elements configured for allocating uplink data.

After obtaining the number $Q'_{RI}$ of resource elements configured for allocating RI values, the number $Q'_{CQI}$ of resource elements configured for allocating CQI/PMI may be obtained through following equation (2):

$$Q'_{CQI} = \min\left(\left\lceil \frac{(O_{CQI} + L) \times M_{SC}^{PUSCH} \times N_{symbol}^{PUSCH} \times \beta_{offset}^{CQI}}{K} \right\rceil, \right.$$
$$\left. M_{SC}^{PUSCH} \times N_{symbol}^{PUSCH} - Q'_{RI}\right) \quad \text{Equation (2)}$$

In the equation (2), $Q'_{CQI}$ is the number of resource elements configured for allocating CQI/PMI, $O_{CQI}$ is the number of bits of the current CQI/PMI (the number of bits of CQI/PMI cannot be changed, while the CQI/PMI are variables), L is a length of CRC detection protecting codes which is required in encoding process, $M_{SC}^{PUSCH}$ is the number of sub-carriers which are allowed to be transmitted, and $N_{Symbol}^{PUSCH}$ is the number of OFDM symbols (for example, 12). To be illustrated more clearly, $N_{Symbol}^{PUSCH}$ is the number of OFDM symbols which are allowed to be transmitted in a subframe after a reference signal RS is deducted, where a subframe has 14 OFDM symbols. Also, K is the total quantity of uplink data that is segmented and protected with a CRC code (i.e., the total number of resource elements of a OFDM subframe), $\beta_{Offset}^{CQI}$ is an offset configured in an upper layer of the communication protocol stack, $\lceil \cdot \rceil$ is a ceiling function, and min(A, B) is to select a minimum value between values A and B. Additionally, in the present disclosure, the band size specified in an uplink grant issued by a base station is in unit of a sub-carrier.

In the equation (2), $$\frac{(O_{CQI} + L) \times M_{SC}^{PUSCH} \times N_{symbol}^{PUSCH}}{K}$$

is the proportion of the number of resource elements configured for allocating CQI/PMI to the maximum number of resource elements configured for allocating uplink data. In addition, the resource element number $Q'_{RI}$ may be obtained in advance by using the equation (1). For example, when $O_{CQI}<=11$, L has a value of "0", and when $O_{CQI}>11$, L has a value of "8" (i.e., 8 of additional bits are required for storing the CRC code).

The disclosure provides a mechanism for processing uplink control information and a method for reporting uplink control information. The mechanism provided in the present disclosure and the proposed method for reporting uplink control information are adapted to a wireless communication device supporting multiple component carriers (CC). The proposed method for reporting uplink control information is only applicable to aperiodic reporting (i.e., a wireless communication device which provides an entire CSI report to a base station all at once via a shared channel (for example, a PUSCH) in response to a dynamic request of the base station).

Figure 2:
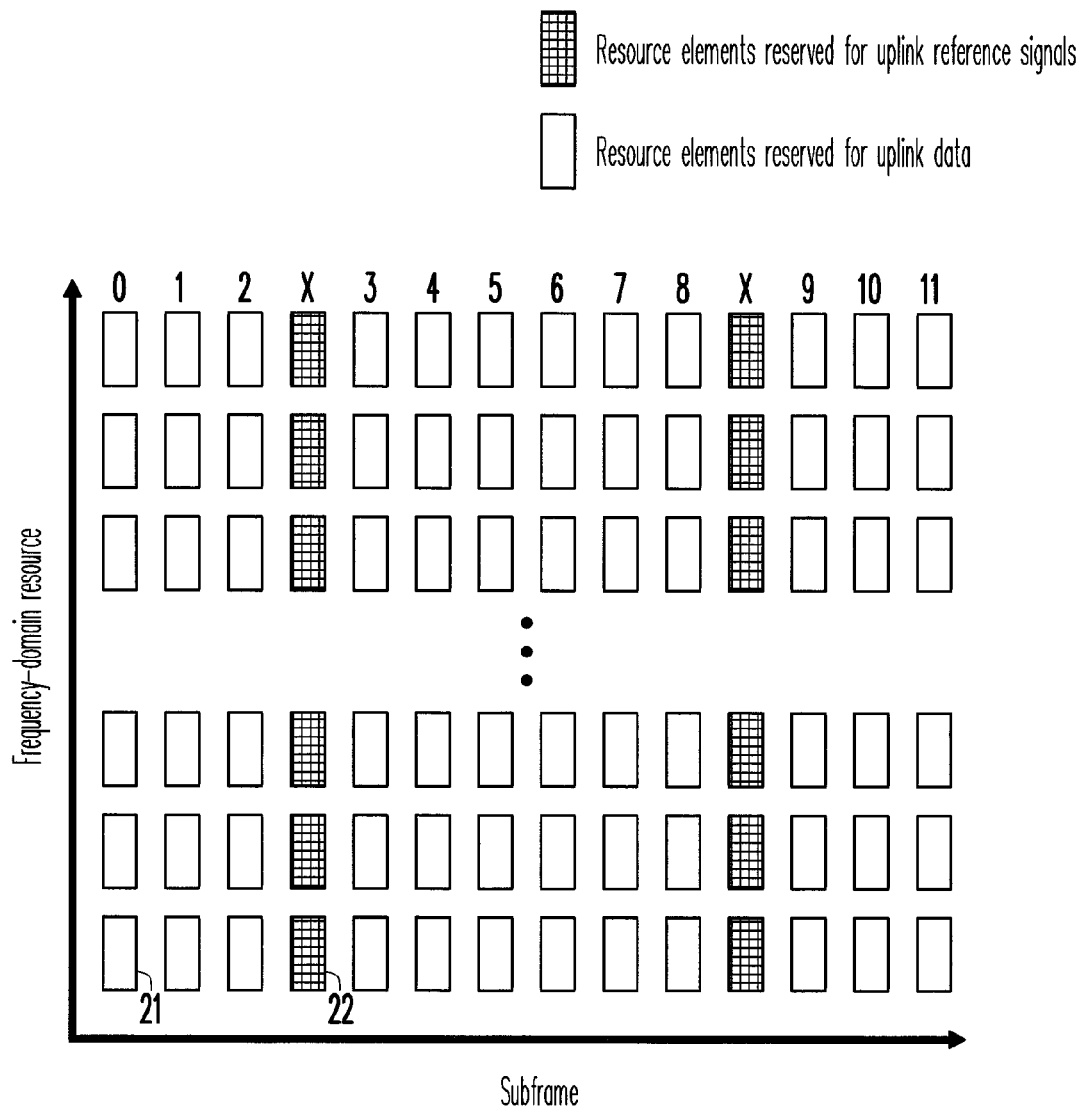
FIG. 2 is a schematic diagram of another OFDM subframe.

FIG. 1 illustrates the layout of uplink data, CQI/PMI, and corresponding RI values expected by a base station when the base station requests a general UE to transmit uplink data via a uplink shared channel and a CSI report of specific activated CC(s) or all activated CCs through a UL grant. FIG. 2 is a schematic diagram of another OFDM subframe. In FIG. 2, a UE cannot successfully measure CSI, and the UE therefore determines not to provide the CSI report of specific activated CC(s) or all activated CCs according to a dynamic request of a base station. Instead, the UE determines to transmit uplink data only and allocate the uplink data at the resource elements with blank background (for example, the resource elements 21). Here, the resource elements with the grid background (for example, the resource elements 22) may still be configured for allocating reference signals. That is, the UE determines not to provide an invalid CSI report. Since the base station expects to receive uplink data, CQI/PMI, and corresponding RI values but the OFDM subframe received by the base station from the UE does not match the expected CSI format, a decoding error may occur at the base station, and the base station may request the UE to provide the CSI report again. As a result, the overall throughput is reduced.

However, if the UE cannot successfully measure the RI value of any CC (i.e., cannot successfully measure the CSI of the CC), it cannot determine the RI/CQI/PMI and calculate the total number of resource elements for RI/CQI/PMI. If the UE is about to provide an invalid CSI report but randomly selects the RI value of the CC, the full payload of the CQI/PMI corresponding to the selected RI value may be large. Accordingly, the number of resource elements configured for allocatinging uplink data, and the overall throughput (or transmission efficiency), may be reduced.

The bit widths of 2 antenna ports and 4 antenna ports with different rank parameters are shown in Table 1 below. The fields in Table 1 respectively represent essential parameters of wireband CSI report such as wideband CQI codeword and PMI. In Table 1, rank=1, 2 are RI values.

TABLE 1

| | Bit width | | | |
| --- | --- | --- | --- | --- |
| | 2 antenna ports | | 4 antenna ports | |
| Field | Rank = 1 | Rank = 2 | Rank = 1 | Rank > 1 |
| Wideband CQI codeword 0 | 4 | 4 | 4 | 4 |
| Wideband CQI codeword 1 | 0 | 4 | 0 | 4 |
| PMI | 2N | N | 4N | 4N |

The value N in foregoing Table 1 may be calculated by using following equations (3) and (4) with reference to following Table 2:

$$N = \lceil N_{RB}^{DL}/k \rceil \qquad \text{Equation (3)}$$

In the equation (3), the parameter N may be obtained according to the current system bandwidth $N_{RB}^{DL}$ and the corresponding sub-carrier size k, and meanwhile, the number M of sub-carriers may be obtained. Further, in the equation (3), $\lceil \bullet \rceil$ is a ceiling function.

TABLE 2

| $N_{RB}^{DL}$ | k (RBs) | M |
| --- | --- | --- |
| 6-7 | N/A | N/A |
| 8-10 | 2 | 1 |
| 11-26 | 2 | 3 |
| 27-63 | 3 | 5 |
| 64-110 | 4 | 6 |

In Table 2, a resource block (RB) is the basic unit of resource in a subframe. For example, 1 RB is composed of 12 carriers in the frequency domain. Further, $N_{RB}^{DL}$ is the system bandwidth of a CC, and k is in unit of a RB.

In the example with 2 antenna ports as listed in Table 1, if the UE randomly selects the RI value of the CC, an unsatisfactory result may be generated. That is, the full payload of the corresponding CQI/PMI may be large. For example, with 2 antenna ports, if rank=1 is randomly selected, the full payload of the CQI/PMI is "4+0+2N", which is greater than the full payload of "4+4+N" of the CQI/PMI when rank=2 is selected.

Similarly, in the example with 4 antenna ports as listed in Table 1, if the UE randomly selects the RI value of the CC, an unsatisfactory result may be generated. That is, the full payload of the corresponding CQI/PMI may be large. For example, with 4 antenna ports, if rank=3 is randomly selected, the full payload of the CQI/PMI is "4+4+4N", which is greater than the full payload of "4+0+4N" of the CQI/PMI when rank=1 is selected.

TABLE 3

| | Bit width | | | |
| --- | --- | --- | --- | --- |
| Field | Rank = 1 | Rank = 2 | Rank = 3 | Rank = 4 |
| Wideband CQI codeword 0 | 4 | 4 | 4 | 4 |
| Wideband CQI codeword 1 | 0 | 4 | 4 | 4 |
| Wideband first PMI i1 | 4 | 4 | 2 | 2 |

TABLE 3-continued

| | Bit width | | | |
| --- | --- | --- | --- | --- |
| Subband second PMI i2 | 4N | 4N | 4N | 3N |
| Field | Rank = 5 | Rank = 6 | Rank = 7 | Rank = 8 |
| Wideband CQI codeword 0 | 4 | 4 | 4 | 4 |
| Wideband CQI codeword 1 | 4 | 4 | 4 | 4 |
| Wideband first PMI i1 | 2 | 2 | 2 | 0 |
| Subband second PMI i2 | 0 | 0 | 0 | 0 |

The essential parameters (for example, wideband CQI codeword, subband differential CQI codeword, and PMI) of a wideband sub-carrier CSI report in an example with 8 antenna ports and different rank parameters are shown in the Table 3. In Table 3, rank=1, 2, 3, 4, 5, 6, 7, 8 are RI values.

In the example with 8 antenna ports in Table 3, if the UE randomly selects the RI value of the CC, the full payload of the corresponding CQI/PMI may be too large. For example, with 8 antenna ports, if the UE randomly selects rank=2, the full payload of the CQI/PMI is "4+4+4+4N", which is greater than the full payload of "4+4+0+0" of the CQI/PMI when rank=8 is selected. Thereby, the full payload (data quantity) of the CSI report is determined by the RI value, and a suitable RI value may be selected through appropriate calculation and determination to have the full payload of the CSI report requiring fewer or the least number of resource elements.

Figure 3:
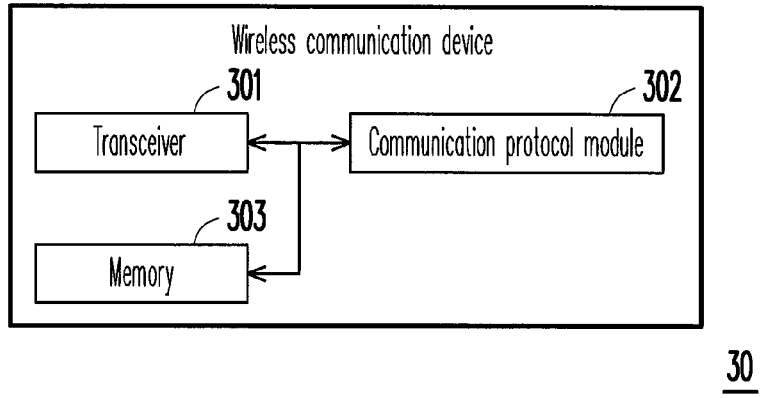
FIG. 3 is a functional block diagram of a wireless communication device according to an exemplary embodiment of the disclosure.

FIG. 3 is a functional block diagram of a wireless communication device according to an exemplary embodiment of the disclosure. Referring to FIG. 3, the wireless communication device 30 may include a transceiver 301, a communication protocol module 302, and a memory 303. The transceiver 301 and the memory 303 are both connected to the communication protocol module 302.

The transceiver 301 is configured to transmit and receive RF signals from a base station within the radio coverage range thereof. The transceiver 301 may perform analog-to-digital signal conversion (ADC), digital-to-analog signal conversion (DAC), modulation, demodulation, signal amplification, low-pass filtering, and bandpass filtering. The transceiver 301 is configured to provide information of a received RF signal (converted from a wireless signal received from the base station or a wireless communication network) to the communication protocol module 302, modulate data received from the communication protocol module 302 into a modulated wireless signal, and transmit the modulated wireless signal to the wireless communication network or the base station.

The communication protocol module 302 is connected to the transceiver 301. The communication protocol module 302 is configured to receive a message from the base station and process a command in the message (or executes corresponding operations according to parameters in the message). The communication protocol module 302 includes a processor and an embedded software or firmware program. The embedded software or firmware program includes program codes of a communication protocol stack. When the processor of the communication protocol module 302 executes the program codes of the communication protocol stack, the communication protocol module 302 measures the CSI of a specific activated downlink CC according to a reference signal received by the transceiver 301 and executes various procedures in a method for reporting uplink control information (which will be described below in the embodiments illustrated in FIG. 4 and FIGS. 5A-5B).

The communication protocol module 302 may further include a determination unit (not shown in FIG. 3). The determination unit may be configured to perform value comparison in order to select a RI value among a plurality of possible RI values, where the total of the selected RI value and the corresponding CQI/PMI is minimum payload size or having minimum number of bits. The memory 303 may be configured for temporarily storing parameters, the number of resource elements configured for calculating the RI value, and the number of resource elements configured for calculating the corresponding CQI/PMI according to a RI value or is configured as a temporary memory space for value comparison.

Additionally, the wireless communication device 30 may further include other components (not shown), such as a processor and an antenna module to accomplish aforementioned functions of the transceiver 301, the communication protocol module 302, and the memory 303.

Figure 4:
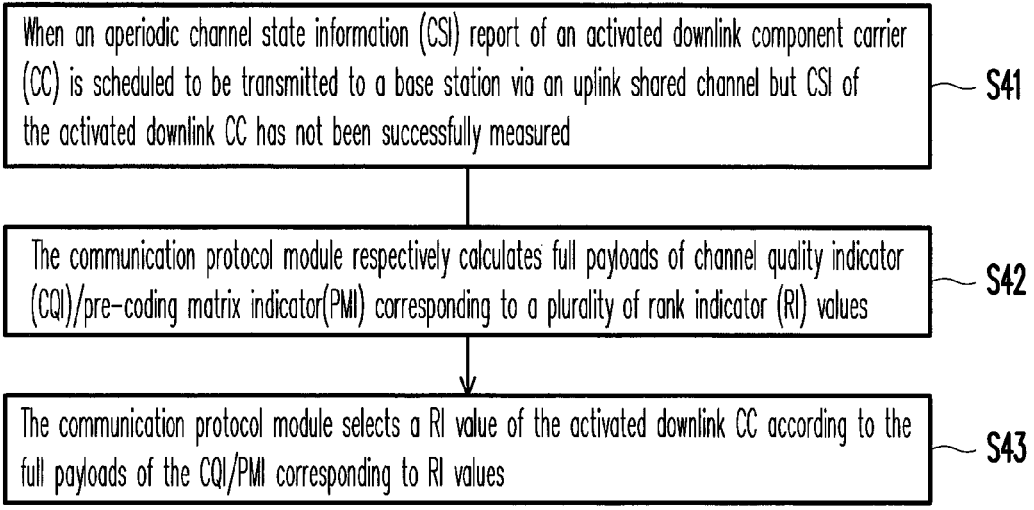
FIG. 4 is a flowchart of a method for reporting uplink control information according to an exemplary embodiment of the disclosure.

FIG. 4 is a flowchart of a method for reporting uplink control information according to an exemplary embodiment of the disclosure. The uplink control information reporting method is applicable, when a base station requests a UE to transmit uplink data via a uplink shared channel and provide a CSI report regarding at least one activated (or just activated) CC and the UE cannot provide a valid CSI report. The UE may not be able to provide a valid CSI report regarding a CC because the CC is just activated and accordingly there is no suitable physical resource (for example, a downlink reference signal) for measuring the CSI or the UE has not encountered periodic downlink reference signal when the UE is requested to provide the CSI report of the CC, and the UE therefore cannot measure the CSI of the CC.

In the uplink control information reporting method, when a UE encounters the situation described above, the UE (for example, the wireless communication device 30) firstly sets the information quantity of the CQI/PMI fields in the CSI report to be "0". Then, the UE respectively selects a RI value for each activated CC on which a CSI report is requested (because the RI value of the activated CC is not actually measured), where the selected RI value allows the CSI report (including CQI/PMI/RI value) to occupy fewer or the least amount of OFDM symbols in the uplink shared channel.

Below, the uplink control information reporting method will be explained in detail with reference to FIG. 3 and FIG. 4. In step S41, when the wireless communication device 30 is scheduled to transmit an aperiodic CSI report of an activated downlink CC to a base station via a uplink shared channel but the communication protocol module 302 of the wireless communication device 30 has not successfully measured the CSI of the activated downlink CC through the transceiver 301, the communication protocol module 302 may execute following steps S42-S43 on the activated downlink CC.

In step S42, the communication protocol module 302 respectively calculates full payloads of CQI/PMI corresponding to a plurality of selectable RI values. The selectable RI values may be figures as shown in Table 1 and Table 3. In the present embodiment, the memory 303 stores aforementioned tables, and these tables respectively record the selectable RI values with different CC layouts.

In step S43, the communication protocol module 302 selects a RI value of the activated downlink CC according to the full payloads of the CQI/PMI corresponding to the selectable RI values.

Figure 5A:
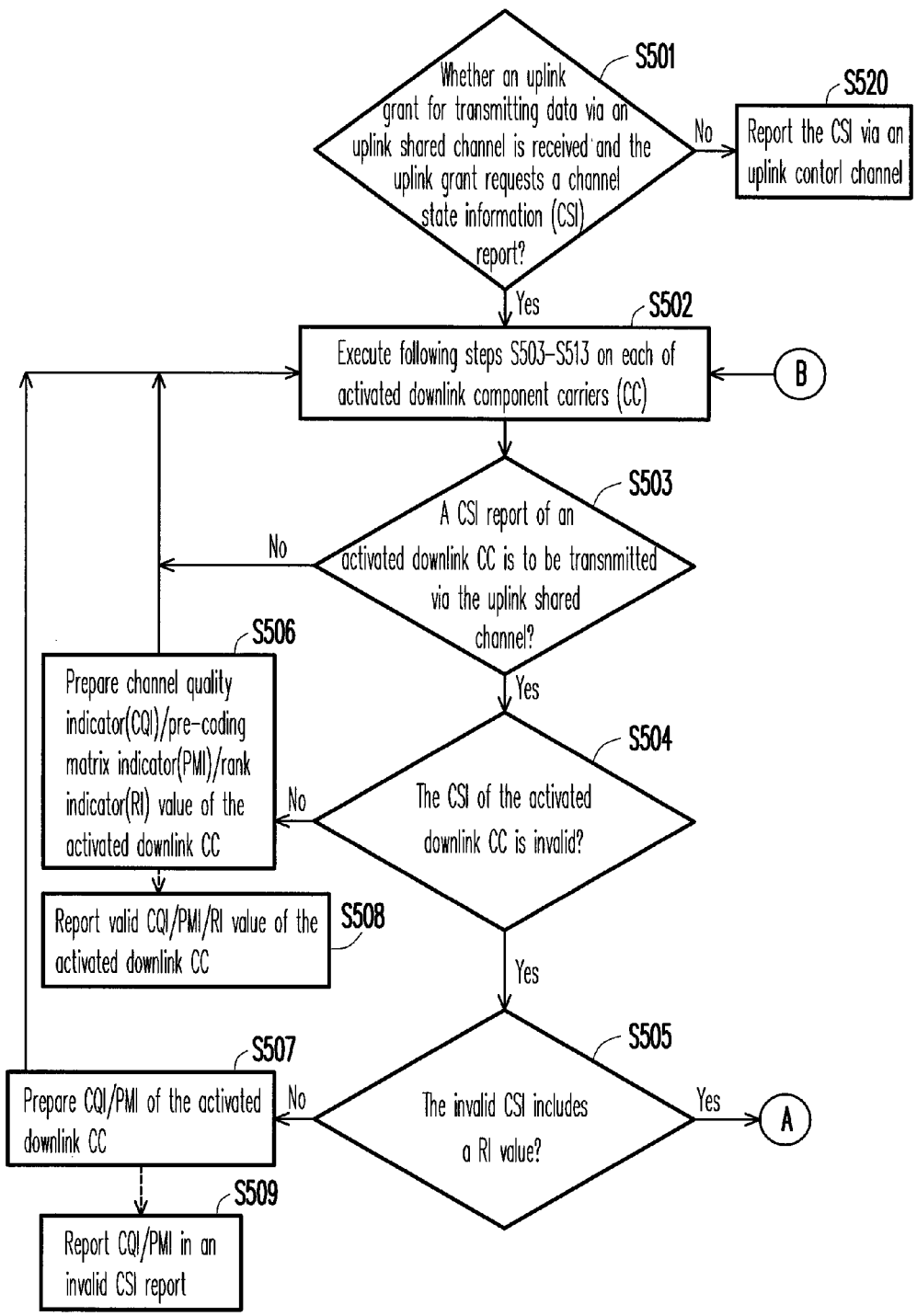
FIG. 5A and FIG. 5B are flowcharts of a method for reporting uplink control information according to an exemplary embodiment of the disclosure.
Figure 5B:
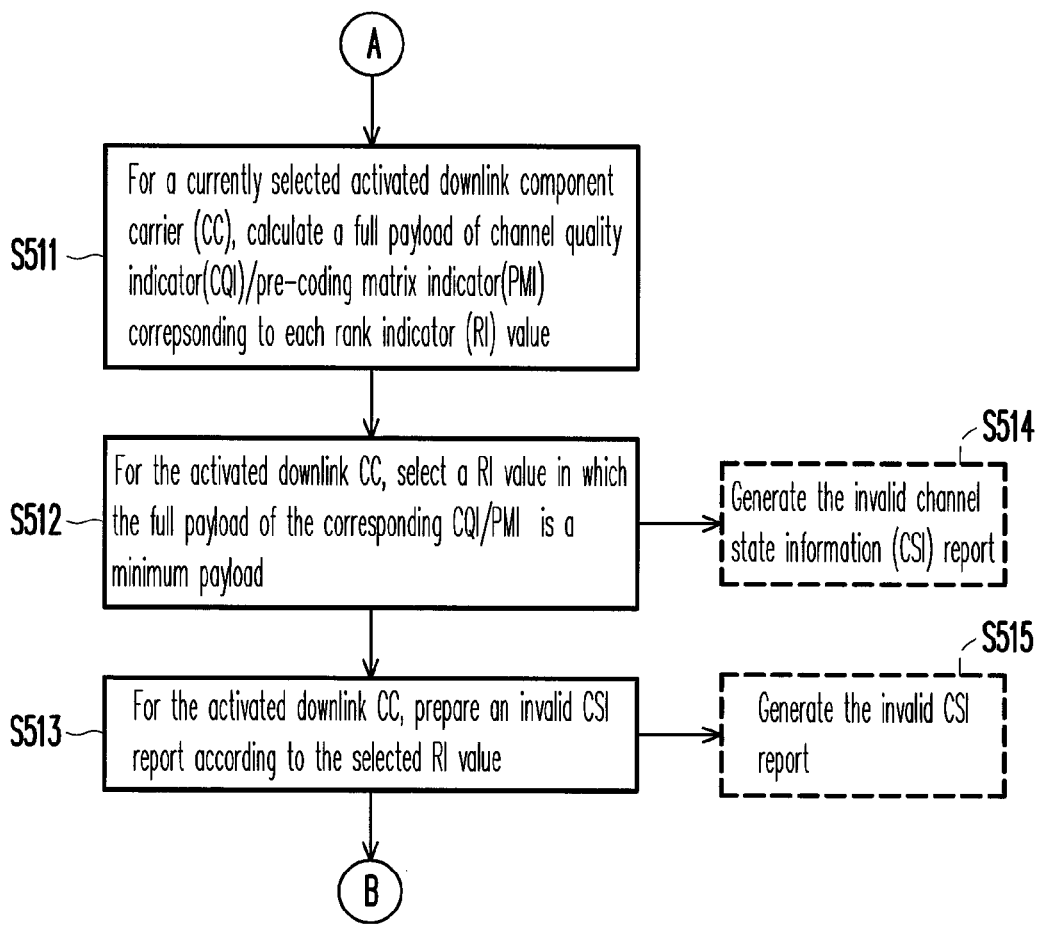

FIG. 5A and FIG. 5B are flowcharts of a method for reporting uplink control information according to an exemplary embodiment of the disclosure. Referring to FIG. 5A, the uplink control information reporting method is adapted to the wireless communication device 30. The implementation details of the uplink control information reporting method in FIG. 4 will be further described below with reference to FIG. 5A and FIG. 5B.

In step S501, the communication protocol module 302 of the wireless communication device 30 determines whether to receive an uplink grant for transmitting data via an uplink shared channel (for example, a PUSCH) from the base station through the transceiver 301, where the uplink grant also requests the wireless communication device 30 to provide a CSI report. In step S501, when the communication protocol module 302 determines that it receives the uplink grant from the base station, step S502 is executed after step S501; otherwise, when the communication protocol module 302 determines that it does not receive the uplink grant from the base station, step S520 is executed after the step S501. In the step S520, the communication protocol module 302 of the wireless communication device 30 provides periodic CSI report via an uplink control channel (for example, a PUCCH).

In step S502, the communication protocol module 302 may execute following steps S503-S513 regarding all activated downlink CCs of the base station. To be illustrated more clearly, the communication protocol module 302 executes following steps S503-S513 on one of the activated downlink CCs. That is, the communication protocol module 302 marks those activated downlink CCs on which aforementioned steps have been executed in a database (not shown) in the memory 303 and selects an activated downlink CC on which part of the steps S503-S513 is not yet executed (or only one of the steps is executed) unit1 all the activated downlink CCs have been selected and any one of the steps S503-S513 has been executed on these activated downlink CCs. After transmitting the CSI report to the base station, the communication protocol module 302 clears the marks on all the activated downlink CCs so that the next aperiodic uplink control information reporting operation may be performed.

In step S503, for the currently selected activated downlink CC, the communication protocol module 302 determines whether to transmit a CSI report of the activated downlink CC via the uplink shared channel. If the communication protocol module 302 determines to transmit the CSI report of the activated downlink CC via the uplink shared channel in the step S503, step S504 is executed after the step S503. If the communication protocol module 302 determines not to transmit the CSI report of the activated downlink CC via the uplink shared channel in the step S503, the step S501 is executed again after the step S503.

In the step S504, for the currently selected activated downlink CC, the communication protocol module 302 determines whether the CSI of the activated downlink CC is invalid (i.e., the RI value of the activated downlink CC cannot be successfully measured). If the communication protocol module 302 determines that the CSI of the activated downlink CC is invalid in the step S504, step S505 is executed after the step S504. If the communication protocol module 302 determines that the CSI of the activated downlink CC is valid in the step S504, step S506 is executed again after the step S504.

In the step S505, for the currently selected activated downlink CC, the communication protocol module 302 determines whether the invalid CSI includes a RI value. If the communication protocol module 302 determines that the invalid CSI includes a RI value in the step S505, step S511 is executed after the step S505. If the communication protocol module 302 determines that the invalid CSI does not include a RI value in the step S505, step S507 is executed again after the step S505.

In step S506, for the currently selected activated downlink CC, the communication protocol module 302 prepares CQI/PMI/RI value corresponding to the activated downlink CC. After the step S506, step S502 may be executed again, or step S508 is executed after part of the steps S503-S513 has been executed on all the activated downlink CCs. In step S508, for the currently selected activated downlink CC, valid CQI/PMI/RI value of the activated downlink CC is reported.

In the step S507, for the currently selected activated downlink CC, the communication protocol module 302 prepares the CQI/PMI of the activated downlink CC. Step S502 may be executed again after the step S507, or after part of the steps S503-S513 has been executed on each activated downlink CCs, the CQI/PMI in the CSI report of each activated downlink CC is reported via the uplink shared channel (step S509).

In the step S511, regarding the currently selected activated downlink CC, the communication protocol module 302 calculates a full payload of the CQI/PMI corresponding to each selectable RI value.

In step S512, for the currently selected activated downlink CC, the communication protocol module 302 selects a RI value in which the full payload of the corresponding CQI/PMI is a minimum payload. Step S514 is executed after step S512 to generate a RI value in the invalid CSI report.

In step S513, for the currently selected activated downlink CC, the communication protocol module 302 prepares an invalid CSI report (including the selected RI value and the corresponding CQI/PMI) according to the selected RI value. Step S515 is executed after the step S513 to generate CQI/PMI in the invalid CSI report. The invalid CSI report generated in the step S513 is temporarily stored into the memory 303, and after part of the steps S503-S513 has been executed on all the activated downlink CCs, the CQI/PMI/RI value of each of the activated downlink CCs is reported via the uplink shared channel. Step S502 is executed again after step S513.

Figure 6A:
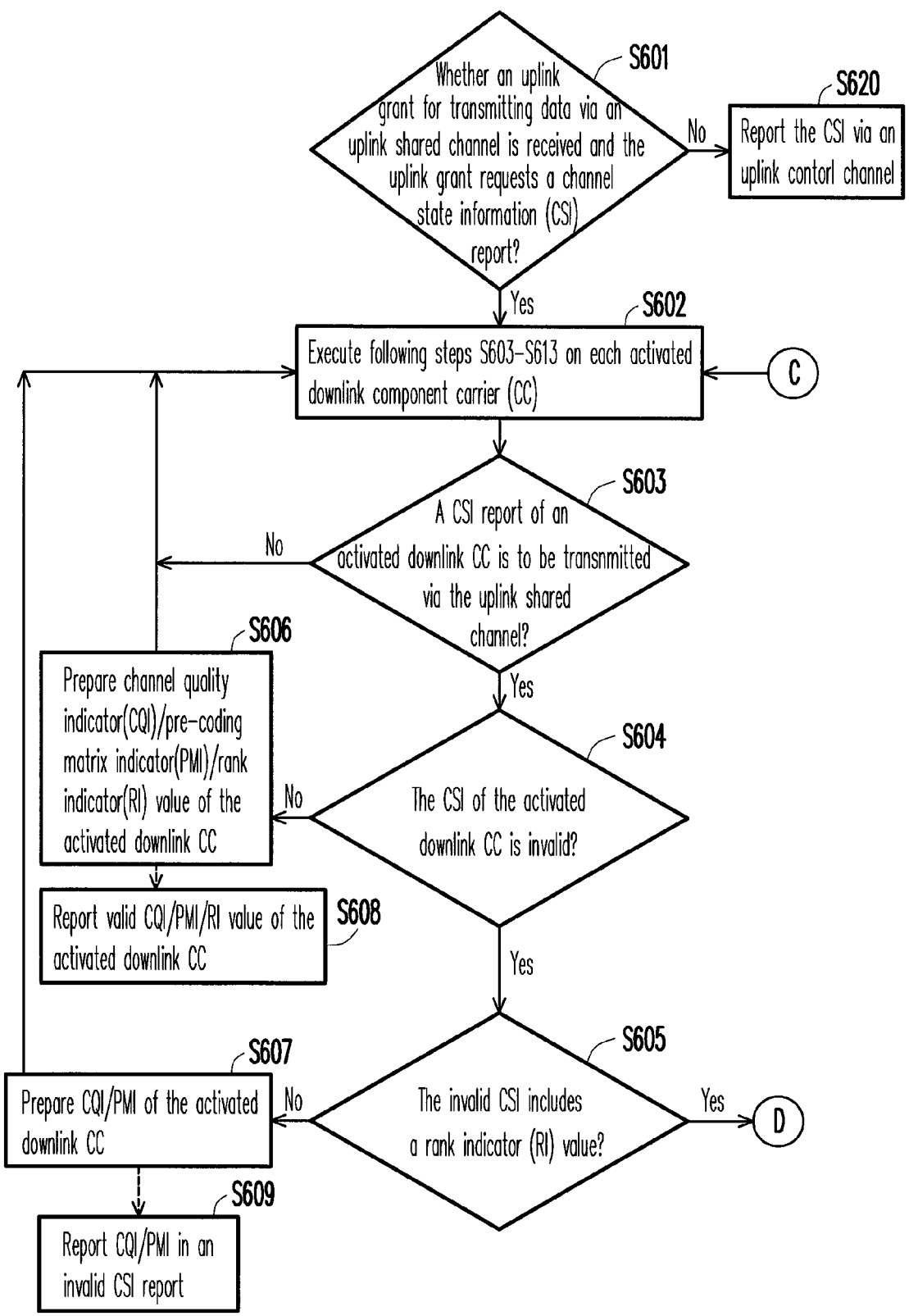
FIG. 6A and FIG. 6B are flowcharts of a method for reporting uplink control information according to another exemplary embodiment of the disclosure.
Figure 6B:
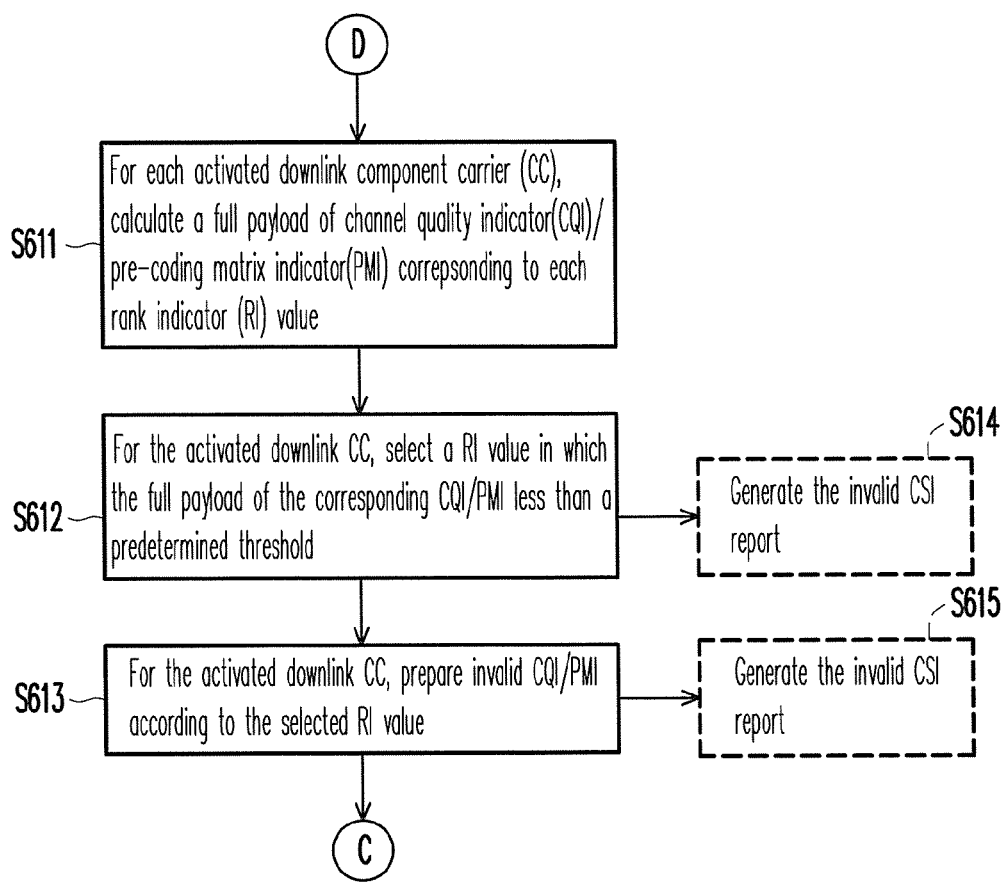

FIG. 6A and FIG. 6B are flowcharts of a method for reporting uplink control information according to another exemplary embodiment of the disclosure. Steps S601-S609 in FIG. 6A are similar to steps S501-S509 in FIG. 5A, and the technical details of steps S601 and S603-S609 will not be described here.

When the communication protocol module 302 determines that it does not receive the uplink grant from the base station in step S601, step S620 is executed after the step S601. In the step S620, the communication protocol module 302 of the wireless communication device 30 provides a periodic CSI report via an uplink control channel (for example, a PUCCH). In step S602, communication protocol module 302 executes following steps S603-S613 on an activated downlink CC. That is, the communication protocol module 302 marks those activated downlink CCs on which aforementioned steps have been executed in a database (not shown) in the memory 303 and selects an activated downlink CC on which part of the steps S603-S613 is not yet executed (including only one of the steps is executed) unit1 all the activated downlink CCs have been selected and any one of the steps S603-S613 has been executed on the activated downlink CCs. After transmitting the CSI report to the base station, the communication protocol module 302 clears the marks of all the activated downlink CCs so that next uplink control information reporting operation may be performed.

Referring to FIG. 6B, in step S611, for the currently selected activated downlink CC, the communication protocol module 302 calculates the full payload of CQI/PMI corresponding to each selectable RI value. In step S612, for the currently selected activated downlink CC, the communication protocol module 302 selects a RI value in which the full payload of the corresponding CQI/PMI less than a predetermined threshold. The predetermined threshold may be 80% of the maximum available CQI/PMI payload size. Step S614 is executed after the step S612, in order to generate the RI value in an invalid CSI report.

In step S613, for the currently selected activated downlink CC, the communication protocol module 302 prepares an invalid CSI report (including the selected RI value and the corresponding CQI/PMI) according to the selected RI value. Step S615 is executed after the step S613 to generate the CQI/PMI in the invalid CSI report. The invalid CSI report prepared in the step S613 is temporarily stored into the memory 303, and after part of the steps S603-S613 has been executed on all the activated downlink CCs, the CQI/PMI/RI value of each of the activated downlink CCs is reported via the uplink shared channel. The Step S602 is executed again after the step S613.

The highest CQI/PMI saving rates corresponding to different CSI formats with a system bandwidth of 20 MHz and respectively 2 antenna ports, 4 antenna ports, and 8 antenna ports are shown in following Table 4. As shown in Table 4, in the wideband CSI with 8 antenna ports, up to 87.5% of the resource elements in the uplink shared channel is saved by adopting the proposed method for reporting uplink control information illustrated in FIGS. 5A-5B, and the proposed method for reporting uplink control information may be configured for transmitting valid uplink data instead of invalid CSI report.

TABLE 4

| System bandwidth = 20 MHz | | | |
|---|---|---|---|
| | 2 antenna ports | 4 antenna ports | 8 antenna ports |
| Wideband CSI report | 14.75% | 6% | 87.5% |
| Higher layer configured subband CSI report | 47.54% | 46.88% | 44.12% |
| UE selected subband CSI report | 17.65% | 36.84% | 34.78% |

The highest CQI/PMI saving rates corresponding to different CSI formats with a system bandwidth of 10 MHz and respectively 2 antenna ports, 4 antenna ports, and 8 antenna ports are shown in following Table 5. As shown in Table 5, in the wideband CSI with 8 antenna ports, up to 83.33% of the resource elements in the uplink shared channel is saved by adopting the uplink control information reporting method illustrated in FIGS. 5A-5B, and which may be configured for transmitting valid uplink data instead of invalid CSI report.

TABLE 5

| System bandwidth = 10 MHz | | | |
|---|---|---|---|
| | 2 antenna ports | 4 antenna ports | 8 antenna ports |
| Wideband CSI report | 11.11% | 9.1% | 83.33% |
| Higher layer configured subband CSI report | 46.67% | 45.83% | 42.31% |
| UE selected subband CSI report | 20.7% | 42.42% | 39.02% |

Table 6 below presents the essential parameters in a simulated uplink data performance scenario. Table 7 below presents the simulation result of the simulated scenario in Table 6. The simulation result shown in Table 7 is obtained in an exemplary embodiment but it is not intended to limit the present disclosure. For example, as shown in Table 7, an invalid CSI report may be transmitted by using as little as 2.5% of the granted uplink physical resource in an uplink shared channel by adopting the method for reporting uplink control information illustrated in FIGS. 5A-5B, and meanwhile, up to 97.5% of the granted uplink physical resources may be configured for transmitting valid uplink data. In addition, by adopting the uplink control information reporting method illustrated in FIGS. 5A-5B, the encoding rate of the uplink data is decreased. In Table 7, the signal-to-noise ratio (SNR) improvement for the uplink data may refer to required SNR for a best scenario and a worst scenario under the same block error rate requirement of (e.g., 10%), and the SNR of the uplink data for the best scenario may be relaxed by approximately 1 dB, as compared to the required SNR of the worst scenario.

TABLE 6

| Parameter | Value |
| --- | --- |
| System bandwidth | 20 MHz |
| Number of downlink antenna ports | 8 |
| CSI reporting method | Wideband |
| Scheduled resource block size | 10 RBs |
| Size of transmission block | 2,280 bits |
| Offset β | 5 |

TABLE 7

| | Worst scenario | Best scenario (correspoindg to a uplink control information reporting method in the present disclosure) |
| --- | --- | --- |
| Percentage of physical resources for transmitting CSI | 16.38% | 2.5% |
| Percentage of physical resources for transmitting uplink data | 83.62% | 97.5% |
| CSI encoding rate | 0.07 | 0.07 |
| uplink data encoding rate | 0.47 | 0.4 |
| SNR improvement for UL_Data (predetermined lowest acceptable BLER = 10%) | | ~1 dB (corresponding to ETU = 60 km/hr) |

Figure 7:
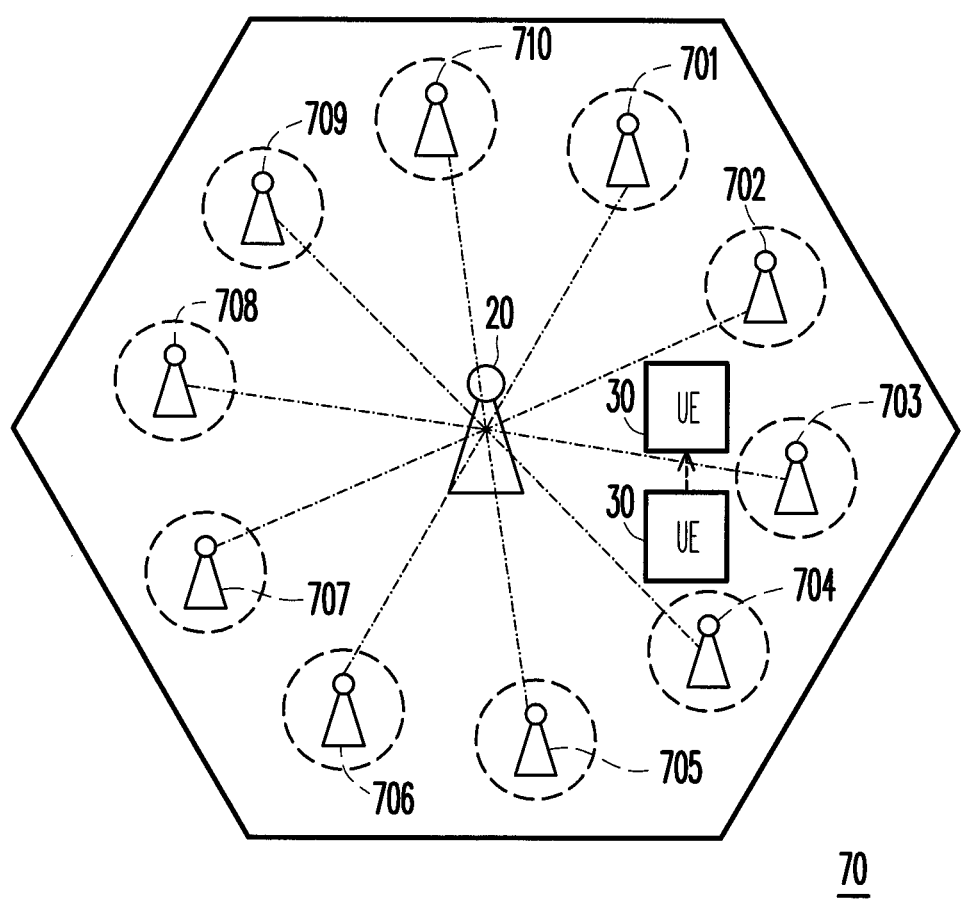
FIG. 7 is a schematic diagram of a coorinated multipoint transmission (CoMP) wireless communication system.

FIG. 7 is a schematic diagram of a coorinated multipoint transmission (CoMP) wireless communication system. The methods for reporting uplink control information illustrated in FIG. 4, FIGS. 5A-5B, and FIGS. 6A-6B are adapted to the CoMP wireless communication system illustrated in FIG. 7. Referring to FIG. 7, the CoMP wireless communication system includes a plurality of CCs. Apart from being distinguished by their frequencies, these CCs may also be distinguished from each other according to their spaces (or physical locations).

To be illustrated more clearly, the CoMP wireless communication system includes a base station 20 and a plurality of remote radio heads (RRH) 701-710. The base station 20 is connected to the plurality of remote radio heads (RRH) 701-710. The hexagonal area in FIG. 7 roughly denotes the radio coverage range of the base station 20. The base station 20 may transmit data and control signals to the RRHs 701-710 via fibers (for example, the dotted lines extended from the base station to the RRHs represent the fiber connections). However, the present disclosure is not limited thereto, and in other embodiments, the wireless signals or RF signals of the base station 20 may also be transmitted to some of the RRHs 701-710 in a wireless transmission manner.

In the present disclosure, the RF signals of the RRHs 701-710 have the same frequency. However, the radio coverage ranges (denoted by the dotted lines around the RRHs 701-710) of the RRHs 701-710 do not overlap each other. Thus, a UE 30 served by the base station 20 considers the same RF signal at different physical locations as different CCs. As described previously, the CCs of the RRHs 701-710 are all assigned to the UE 30 by the base station 20, and only some of the CCs are activated. The RRHs 701-710 may be considered as a joint transmission distributed antenna system composed of a plurality of anntenas.

For example, when the UE 30 moves to a location between the RRH 703 and the RRH 704, the UE 30 may detect wireless signals of the RRHs 702-705 but may not be able to detect the wireless signals of the RRHs 701 and 706-710. When the UE 30 moves to a location between the RRH 703 and the RRH 704, the base station 20 may request the UE 30 to measure CSI of a CC transmitted by the RRH 701 and provide a CSI report of the CC of the RRH 701 via an uplink shared channel. As described previously, the UE 30 may not be able to successfully measure the CSI of the CC of the RRH 701 within a predetermined time period. Thus, while requested to provide a CSI report to the base station 20 via the uplink shared channel, the UE 30 may provide an invalid CSI report for the CC of the RRH 701. In addition, the UE 30 may reduce the data quatity of the CSI report in the uplink shared channel and accordingly increase the overall transmission efficiency by adopting the methods for reporting uplink control information illustrated in FIG. 4, FIGS. 5A-5B, and FIGS. 6A-6B.

In summary, the present disclosure provides methods for reporting uplink control information in a wireless communication system and a wireless communication device using the same methods, where the wireless communication device supports multiple CCs. When the wireless communication device is requested by a base station to report a CSI report of a specific activated downlink CC but the wireless communication device has not yet successfully measured the CSI of the activated downlink CC, the wireless communication device may report an invalid CSI in an aperiodic CSI report of an activated downlink CC via an uplink shared channel, respectively calculate full payloads of corresponding CQI/PMI of selectable RI values, and select a RI value corresponding to a minimum payload or a smaller payload. Thereby, the data quantity of the invalid CSI in the uplink shared channel may be reduced, and accordingly the uplink throughput of valid data may be increased.

It will be apparent to those skilled in the art that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents.

What is claimed is:

1. A method for reporting uplink control information, adapted to a wireless communication device supporting multiple component carriers (CC), the method comprising:
 when the wireless communication device is scheduled to transmit an aperiodic channel state information (CSI) report of an activated downlink CC to a base station via an uplink shared channel but the wireless communication device has not successfully measured a CSI of the activated downlink CC, the wireless communication device executing following steps on the activated downlink CC:
  determining whether the aperiodic CSI report is an invalid CSI report,
  when the aperiodic CSI report is an invalid CSI report, determining whether the invalid CSI report comprises a RI value, wherein the invalid CSI report is caused since the CSI report is triggered upon receiving an activation command of the activated downlink CC;
  respectively calculating full payloads of channel quality indicator (CQI)/precoding matrix indicator (PMI) corresponding to a plurality of selectable rank indicator (RI) values; and
  selecting a RI value of the activated downlink CC according to the full payloads of the CQI/PMI corresponding to the selectable RI values.

2. The method for reporting uplink control information of claim 1 further comprising:
  when the invalid CSI report comprises a RI value, respectively calculating the full payloads of the CQI/PMI corresponding to the selectable RI values.

3. The method for reporting uplink control information of claim 1, wherein the step of selecting the RI value according to the full payloads of the CQI/PMI corresponding to the selectable RI values comprises:
  selecting one of the selectable RI values as the RI value, wherein the full payload of the CQI/PMI corresponding to the selected RI value is a minimum payload.

4. The method for reporting uplink control information of claim 1, wherein the step of selecting the RI value according to the full payloads of the CQI/PMI corresponding to the selectable RI values comprises:
  selecting the RI value of the activated downlink CC according to the full payloads of the CQI/PMI and a predetermined threshold wherein the full payloads of the CQI/PMI are corresponding to the selectable RI values.

5. The method for reporting uplink control information of claim 4, wherein the step of selecting the RI value according to the full payloads of the CQI/PMI corresponding to the selectable RI values and the predetermined threshold comprises:
  selecting one of the selectable RI values as the RI value, wherein the full payload of the CQI/PMI corresponding to the selected RI value is less than the predetermined threshold.

6. The method for reporting uplink control information of claim 1 further comprising:
  when the aperiodic CSI report is not an invalid CSI report, preparing CQI/PMI/RI value of the activated downlink CC, and reporting the CQI/PMI/RI value of the activated downlink CC through the aperiodic CSI report.

7. The method for reporting uplink control information of claim 1 further comprising:
  when the invalid CSI report does not comprise a RI value, preparing invalid CQI/PMI of the activated downlink CC, and reporting the invalid CQI/PMI of the activated downlink CC through the aperiodic CSI report.

8. A wireless communication device, comprising:
  a transceiver, configured for receiving wireless signals from a base station and transmitting wireless signals to the base station; and
  a communication protocol module, connected to the transceiver, configured for receiving at least one downlink CC from the base station via the transceiver, measuring a CSI of the at least one downlink CC through the transceiver, and receiving a request message which requires an aperiodic CSI report of an activated downlink CC to be transmitted via an uplink shared channel from the base station, wherein
  when the aperiodic CSI report is scheduled to be transmitted but a CSI of the activated downlink CC is not successfully measured by the wireless communication device, the communication protocol module determines whether the aperiodic CSI report is an invalid CSI report,
  when the aperiodic CSI report is an invalid CSI report, determining whether the invalid CSI report comprises a RI value, wherein the invalid CSI report is caused since the CSI report is triggered upon receiving an activation command of the activated downlink CC;
  the communication protocol module respectively calculates full payloads of CQI/PMI corresponding to a plurality of selectable RI values of the activated downlink CC; and
  the communication protocol module selects a RI value of the activated downlink CC according to the full payloads of the CQI/PMI corresponding to the selectable RI values.

9. The wireless communication device of claim 8, wherein:
  when the communication protocol module determines that the invalid CSI report comprises a RI value, the communication protocol module respectively calculates the full payloads of the CQI/PMI corresponding to the selectable RI values.

10. The wireless communication device of claim 8, wherein:
  the communication protocol module selects one of the selectable RI values as the RI value, wherein the full payload of the CQI/PMI corresponding of the selected RI value is a minimum payload.

11. The wireless communication device of claim 8, wherein:
  the communication protocol module selects the RI value of the activated downlink CC according to the full payloads of the CQI/PMI corresponding to the selectable RI values and a predetermined threshold.

12. The wireless communication device of claim 8, wherein:
  the communication protocol module selects one of the selectable RI values as the RI value, wherein the full payload of the CQI/PMI corresponding to the selected RI value is less than the predetermined threshold.

13. The wireless communication device of claim 8, wherein:
  when the communication protocol module determines that the aperiodic CSI report is not an invalid CSI report, the communication protocol module prepares CQI/PMI/RI value of the activated downlink CC and reports the CQI/PMI/RI value of the activated downlink CC through the aperiodic CSI report.

14. The wireless communication device of claim 8, wherein when the communication protocol module determines that the invalid CSI report does not comprise a RI value, the communication protocol module prepares invalid CQI/PMI of the activated downlink CC and reports the invalid CQI/PMI of the activated downlink CC through the aperiodic CSI report.

* * * * *